United States Patent [19]

Speckhart et al.

[11] Patent Number: 5,141,094

[45] Date of Patent: Aug. 25, 1992

[54] APPARATUS FOR UNLOADING ARTICLES

[75] Inventor: Bernard Speckhart, Short Hills, Paul M. Berson, Mountain Lakes, both of N.J.

[73] Assignee: White Conveyors, Inc., Kenilworth, N.J.

[21] Appl. No.: 643,435

[22] Filed: Jan. 22, 1991

[51] Int. Cl.⁵ .............................................. B05G 37/00
[52] U.S. Cl. .................................. 198/349; 198/486.1; 198/678.1
[58] Field of Search .................... 198/349, 349.95, 350, 198/502.3, 486.1, 678.1

[56] References Cited

U.S. PATENT DOCUMENTS

| | | | |
|---|---|---|---|
| 1,412,631 | 4/1922 | Righter | 209/3.3 |
| 1,861,600 | 6/1932 | Harrison | 198/681 X |
| 1,998,109 | 4/1935 | Walter, Jr. | 198/465.4 |
| 2,449,669 | 9/1948 | Pohlers | 198/727 |
| 2,536,575 | 1/1951 | Seldin | 198/687.1 |
| 2,573,334 | 10/1951 | Hitz | 198/687.1 |
| 2,583,968 | 1/1952 | Rosseau | 198/346.3 |
| 2,645,186 | 7/1953 | Davis | 198/465.4 X |
| 2,708,501 | 5/1955 | Boehm | 198/409 |
| 2,750,897 | 6/1956 | Davis | 198/738 |
| 2,751,091 | 6/1956 | Freeman | 198/352 |
| 2,846,049 | 8/1958 | Carlson | 198/360 |
| 2,861,676 | 11/1958 | Rasmussen et al. | 198/744 |
| 2,868,354 | 1/1959 | Harrison | 198/465.4 |
| 2,899,072 | 8/1959 | Weiss | 198/678.1 |
| 2,916,132 | 12/1959 | Leiser | 198/464.3 |
| 2,918,164 | 12/1959 | Austin et al. | 198/366 |
| 2,947,407 | 8/1960 | Wood | 198/360 |
| 2,998,136 | 8/1961 | Gerisch | 198/366 |
| 3,017,025 | 1/1962 | Stephen | 209/574 |
| 3,090,481 | 5/1963 | Biel et al. | 198/744 |
| 3,113,659 | 12/1963 | Oda et al. | 198/465.4 |

(List continued on next page.)

FOREIGN PATENT DOCUMENTS

| | | |
|---|---|---|
| 334127 | 7/1933 | Canada . |
| 690778 | 7/1964 | Canada . |
| 726529 | 1/1966 | Canada . |
| 1018472 | 10/1977 | Canada . |
| 1018931 | 10/1977 | Canada . |
| 1140139 | 11/1962 | Fed. Rep. of Germany . |
| 1205448 | 11/1965 | Fed. Rep. of Germany ...... 198/349 |
| 2525070 | 12/1976 | Fed. Rep. of Germany ...... 198/350 |
| 0737325 | 6/1980 | U.S.S.R. ............................ 198/350 |
| 1221112 | 3/1986 | U.S.S.R. ............................ 198/350 |

OTHER PUBLICATIONS

Master-Veyor brochure, published by Speed Check Conveyor Co., Inc. Decatur, Ga., pp. 1-4.
Sorting Carosel brochure, published by Dunnewolt U.S.A. Inc., Dallas, Tex., pp. 1-4.
My-T-Veyor brochure, Model No. 830, published by My-T-Veyor, Oxford, Mich., pp. 1-3.
Sort-O-Veyor brochure, published by Speed Check Conveyor Co. Inc., Decatur, Ga., pp. 1-4.
Quick Assembly brochure, published by Natmar, Inc., Cincinatti, Ohio, pp. 1-2.
Controlling Hospital Garments, Wim Giezeman, Textile Rental, Jun. 1982, pp. 34-36, 38.

Primary Examiner—Robert P. Olszewski
Assistant Examiner—Cheryl L. Gastineau
Attorney, Agent, or Firm—Kenyon & Kenyon

[57] ABSTRACT

An apparatus conveys hooked members and has a plurality of carrier assemblies coupled together in an end-to-end fashion. Each carrier assembly is adapted to receive and support several hooked members, and includes several apertures, wherein each aperture corresponds in position to a respective hooked member. A reflective target is supported on one side of the carrier assemblies and is located in line with the apertures. An optical sensor is located on the side of the carrier assemblies opposite the reflective target, and is adapted to sense the presence of the target and, thus, the passage of an aperture between the optical sensor and the target. The optical sensor in turn generates output signals indicative of the passage of each aperture, and the hooked members are released from the carrier assemblies based on the output signals.

20 Claims, 4 Drawing Sheets

U.S. PATENT DOCUMENTS

| | | | |
|---|---|---|---|
| 3,124,236 | 3/1964 | Gerisch | 198/360 |
| 3,151,730 | 10/1964 | Buenten | 198/352 |
| 3,152,682 | 10/1964 | Rutkovsky et al. | 198/351 |
| 3,164,245 | 1/1965 | Juengel | 198/841 |
| 3,184,042 | 5/1965 | Rutkovsky et al. | 198/367 |
| 3,194,383 | 7/1965 | Kuwertz | 198/349 |
| 3,200,933 | 8/1965 | Schenk et al. | 198/350 |
| 3,247,952 | 4/1966 | Kozlosky | 198/360 |
| 3,403,767 | 10/1968 | Gerisch | 198/360 |
| 3,415,352 | 12/1968 | Gerisch | 198/370 |
| 3,422,950 | 1/1969 | Bachmann | 198/680 |
| 3,454,148 | 7/1969 | Harrison | 198/465.4 |
| 3,469,667 | 9/1969 | Gerisch | 193/40 |
| 3,511,359 | 5/1970 | Gerisch | 198/369 |
| 3,557,935 | 1/1971 | Gerisch | 198/366 |
| 3,581,887 | 6/1971 | Radutsky et al. | 209/546 |
| 3,622,000 | 11/1971 | McClenny | 198/680 X |
| 3,786,911 | 1/1974 | Milazzo | 198/718 |
| 3,799,318 | 3/1974 | Dekoekkoek | 198/463.5 |
| 3,942,340 | 3/1976 | Kirkby | 68/3 R |
| 3,961,699 | 6/1976 | Hirsch | 198/464.1 |
| 4,018,327 | 4/1977 | Goodman et al. | 198/723 |
| 4,022,338 | 5/1977 | Laursen | 198/463.3 X |
| 4,027,598 | 6/1977 | Swilley | 198/743 X |
| 4,036,365 | 7/1977 | Rosenfeld | 209/3.1 |
| 4,214,663 | 7/1980 | Schopp et al. | 198/349 X |
| 4,239,435 | 12/1980 | Weiss et al. | 209/942 X |
| 4,943,198 | 7/1990 | McCabe | 198/434 |

APPARATUS FOR UNLOADING ARTICLES

FIELD OF THE INVENTION

The present invention relates to apparatus for conveying articles and, in particular, to apparatus for conveying articles supported on hooked members.

BACKGROUND INFORMATION

Apparatus for conveying articles and, in particular, articles supported on hooked members are used in various industries. For example, articles conveyed in an assembly line are frequently supported on hooked members, wherein the hooked members are carried by a conveyor so that the articles can be used or worked on in the assembly line.

It has been difficult, however, to automatically count the hooked members or articles on a conveyor, or to automatically keep track of the position of each hooked member or article on a conveyor. It has also been difficult to automatically release predetermined articles from a conveyor into predetermined locations. For example, if the position of each article on a conveyor is not accurately determined, then the articles can be automatically released into the wrong locations.

In laundry and dry cleaning facilities, the hooked members are hangers and the articles are garments supported on the hangers. Typically, several hundred garments are placed on hangers and loaded onto a sorting conveyor. There are several drop-off stations located at various points along the sorting conveyor which are adapted to receive the garments prior to delivery to the customers. The garments are sorted by moving the sorting conveyor and by delivering each garment into a predetermined drop-off station. The sorted garments located at one or more drop-off stations are loaded into trucks for delivery to the customers.

The position of each garment on the sorting conveyor can be registered in a computer. The computer can then be used to prepare a specific sorting sequence for delivering the garments into the respective drop-off stations. It has been difficult, however, for such systems to automatically and accurately determine the position of each garment as it reaches its predetermined drop-off station. If the position of the garment is not accurately determined, the garments can be delivered to the wrong drop-off stations.

It has also been difficult to accurately count the successive garments as they pass each drop-off station. If the garments are not accurately counted, the garments can likewise be delivered to the wrong drop-off stations.

SUMMARY OF THE INVENTION

The present invention is directed to an apparatus for conveying articles supported on hooked members. The apparatus comprises a carrier member adapted to convey the hooked members. A target member is supported on one side of the carrier member, and a sensor is supported on the opposite side of the carrier member relative to the target member. The sensor is adapted to sense the target member and generate a signal indicative thereof.

In an apparatus of the present invention, the carrier member defines a plurality of first apertures. Each first aperture corresponds to a respective hooked member supported on the carrier member. Upon the passage of each first aperture between the target member and the sensor, the sensor senses the target member and generates a first signal indicative thereof.

An apparatus of the present invention further comprises a control unit coupled to the sensor, and adapted to determine the position of each hooked member on the carrier member based on the first signals transmitted by the sensor. The carrier member preferably further defines a second aperture, which is defined by a different dimension in the direction of conveyance in comparison to that of each first aperture. Thus, upon the passage of the second aperture between the target member and the sensor, the sensor senses the target member and, in turn, transmits a second signal indicative thereof to the control unit. The second signal has a different duration than each first signal and, thus, the control unit is adapted to differentiate between the first and second signals.

An apparatus of the present invention further comprises a release member coupled to the control unit. The release member is adapted to be actuated by the control unit in response to a first or second signal transmitted by the sensor to release a corresponding hooked member from the carrier member. The apparatus preferably further comprises a plurality of latch members coupled to the carrier member. Each latch member corresponds in position to a respective first aperture and is adapted to support a hooked member. The release member is adapted to be actuated to move each latch member and, in turn, release the respective hooked member. A drive unit is coupled to the release member and to the control unit, and is adapted to be actuated by the control unit to move the release member into contact with a latch member to release the respective hooked member from the carrier member.

One advantage of the apparatus of the present invention, is that the sensor, the target member, and the first apertures permit the automatic and reliable counting of the passing of each article, the determination of the position of each article on the carrier member, and the correct release of the articles into predetermined locations.

Other advantages of the apparatus of the present invention will become apparent in view of the following detailed description and drawings taken in connection therewith.

DETAILED DESCRIPTION

Figure 1:
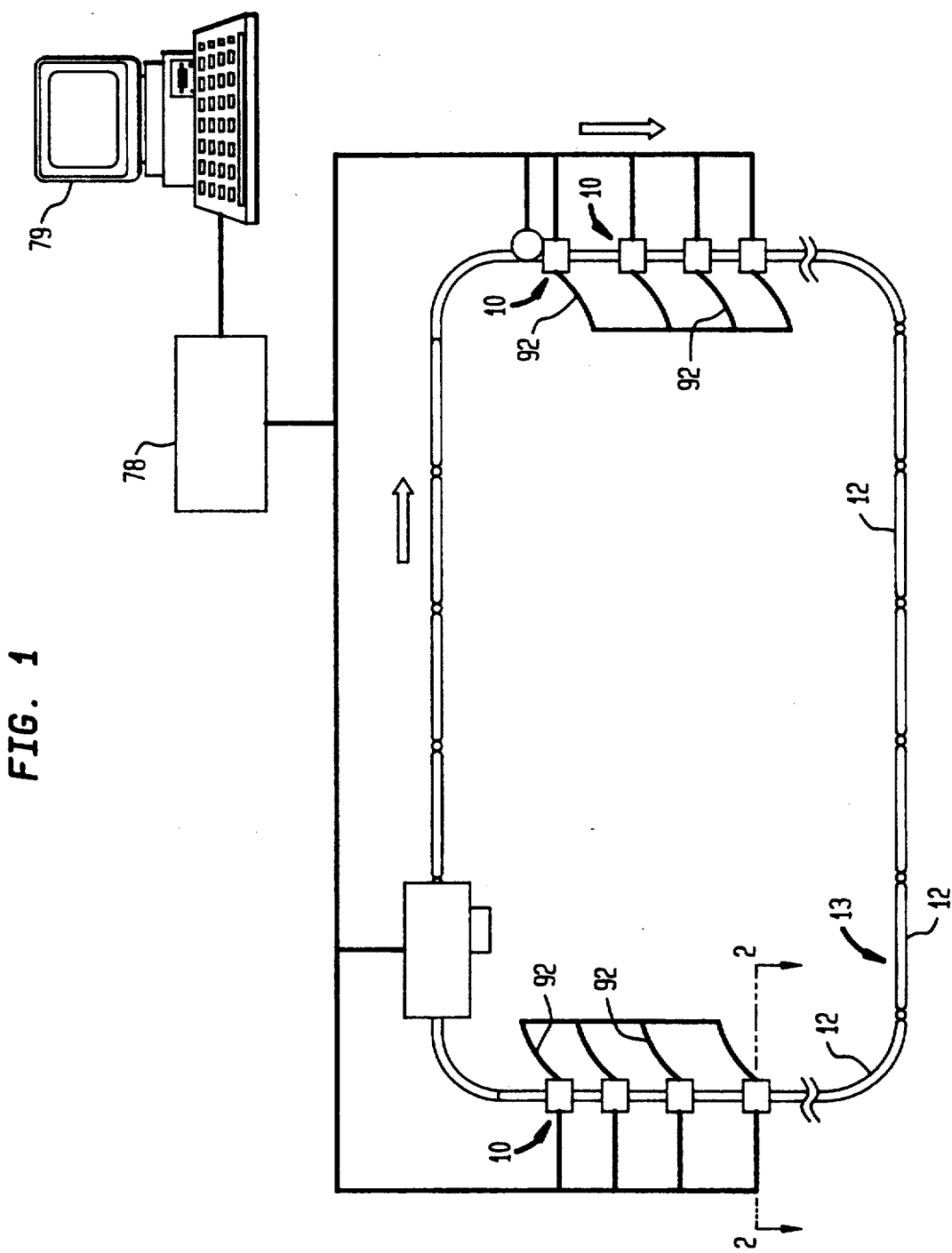
FIG. 1 is a top plan view of a conveyor system including several apparatus embodying the present invention.

In FIG. 1, a conveying system is illustrated including several apparatus embodying the present invention, each indicated generally by the reference numeral 10. In the embodiment of the present invention illustrated, the apparatus 10 is used in a system for conveying garments supported on hangers. However, it should be pointed out that the apparatus of the present invention can equally be adapted for use in other types of conveying systems and for conveying other types of articles supported on hooked members.

Figure 2:
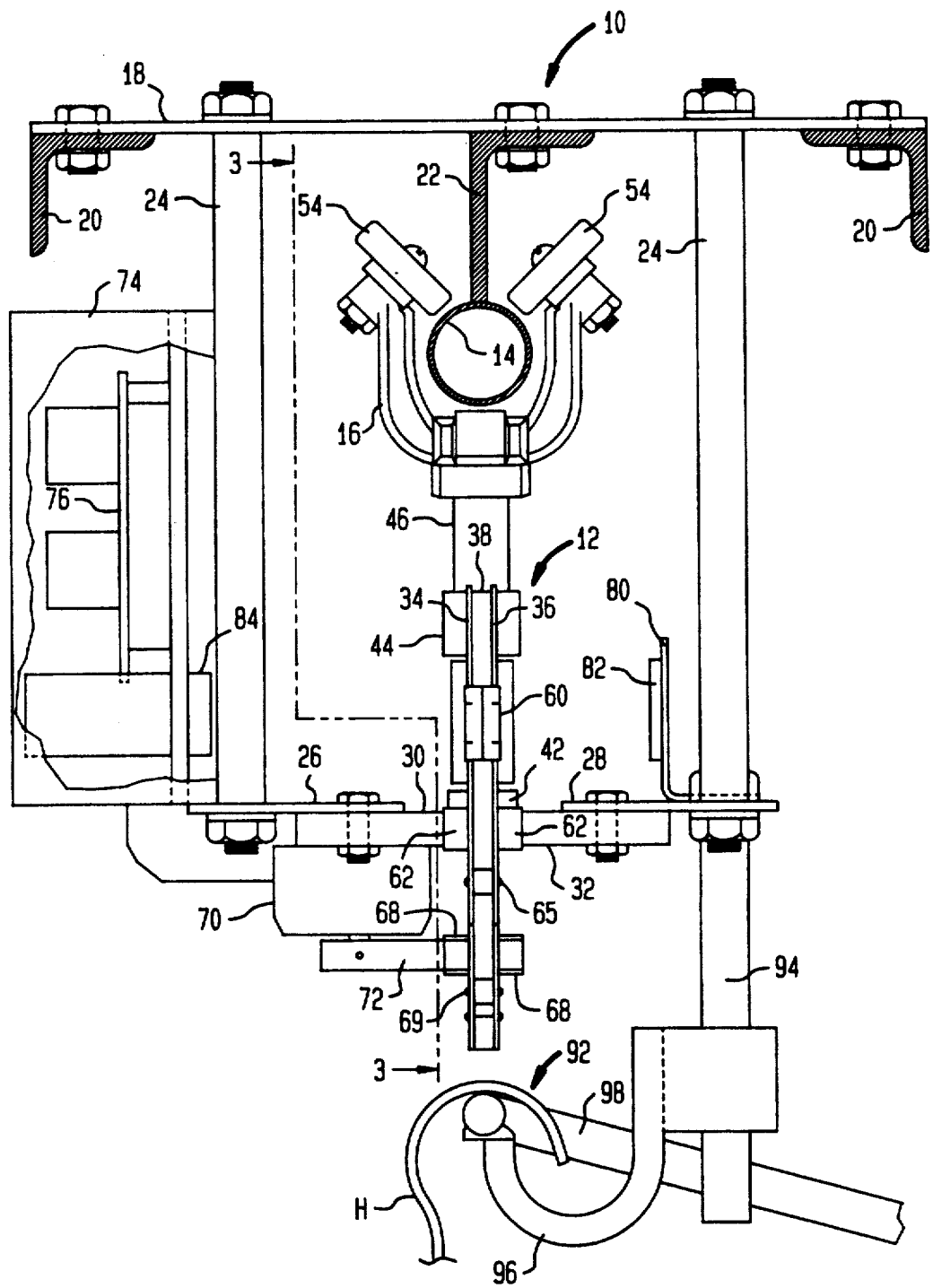
FIG. 2 is an enlarged, partial cross-sectional view of the apparatus embodying the present invention taken along the line 2—2 of FIG. 1.

The apparatus 10 is illustrated in further detail in FIG. 2, and includes a carrier link 12 supported from a conveyor rail 14 by a yoke 16. A plurality of carrier links 12 are coupled to each other in an end-to-end fashion and supported from the conveyor rail 14, thus forming a sorting conveyor 13, as shown in FIG. 1.

The other components of the sorting conveyor 13 can be types known to those of ordinary skill in the art, such as those shown and described in U.S. Pat. No. 4,239,435, dated Dec. 16, 1980, to Weiss et al., which is hereby expressly incorporated by reference herein.

A support plate 18 is supported from a ceiling or other structure in a building (not shown) by support brackets 20 on either side, as shown in FIG. 2. The conveyor rail 14 is supported from the mid-section of the support plate 18 by a conveyor support bracket 22. Support rods 24 are each coupled on one end to the support plate 18 and project downwardly on opposite sides of the conveyor rail 14 relative to each other.

A first mounting plate 26 is supported from support rods 24 (only one shown) on one side of the carrier 12. A second mounting plate 28 is supported from support rods 24 (only one shown) on the other side of the carrier 12. As shown in FIG. 2, the first and second mounting plates 26 and 28, respectively, are each oriented in a plane substantially perpendicular to the axes of the support rods 24.

A first guide member 30 is supported from the underside of the first mounting plate 26 and projects inwardly toward the carrier 12. A second guide member 32 is supported from the underside of the second mounting plate 28 and also projects inwardly toward the carrier 12. As shown in FIG. 2, the first and second guide members 30 and 32, respectively, define a space between them which is adapted to permit the carrier 12 to move therethrough. The first and second guide members 30 and 32 are preferably made of a material having a low coefficient of friction, such as a phenolic resin laminate, in order to facilitate the ability of the carrier 12 to move between the guide members, as is described further below.

Figure 3:
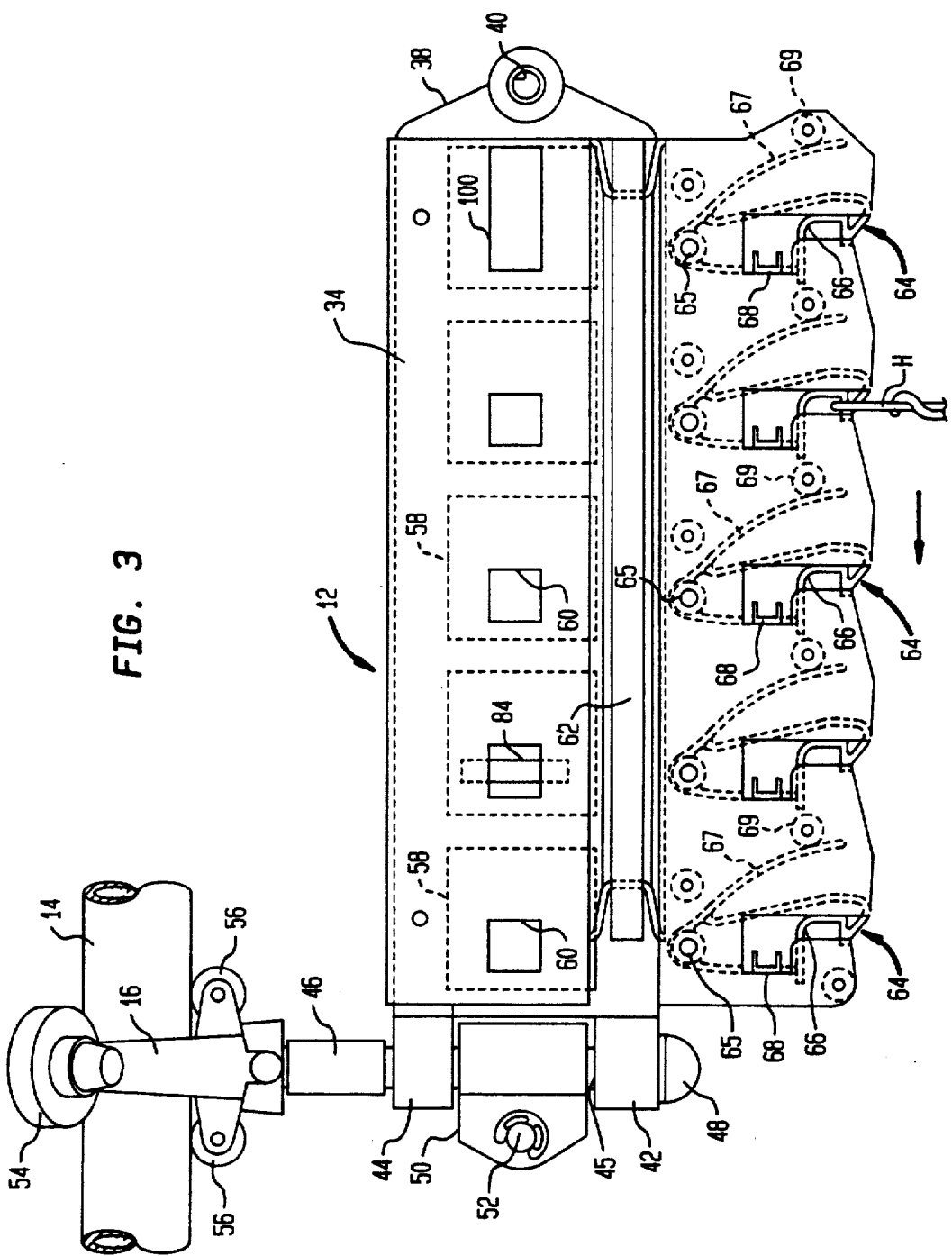
FIG. 3 is a partial side plan view of the apparatus of FIG. 2 taken along the line 3—3 of FIG. 2.

The carrier 12 includes a first carrier frame 34 on one side, and a second carrier frame 36 coupled to the first frame 34 on the other side. A link frame 38 is coupled between the first frame 34 and second frame 36. As shown in FIG. 3, the link frame 38 includes a mounting aperture 40 extending through one end, which is adapted to receive a mounting pin, as is described further below. The other end of the carrier frame 38 includes a first mounting flange 42 on the bottom corner and a second mounting flange 44 on the top corner. The first and second mounting flanges 42 and 44, respectively, are each adapted to receive a hinge pin 45, as shown in FIG. 3.

The hinge pin 45 is coupled on one end to the yoke 16, and includes a knob 48 on the other end to support the carrier frame 38 and, thus, the carrier 12. A collar 46 is fitted over the hinge pin 45 between the second mounting flange 44 and the yoke 16. The mounting flanges 42 and 44 are rotatable relative to the hinge pin 45. The carrier 12 is therefore adapted to pivot relative to the yoke 16 upon movement around a corner, for example, of the conveyor rail 14.

A connecting member 50 is fitted over the hinge pin 45 between the bottom flange 42 and top flange 44, as shown in FIG. 3. The connecting member 50 includes a connecting pin 52 extending through a side wall. The connecting member 50 is adapted to fit over the other end of an adjacent link frame 38 (not shown in FIG. 3). The connecting pin 52 is, in turn, adapted to be fitted through the mounting aperture 40 of the other link frame 30 to connect the two carriers 12 together in an end-to-end fashion. Each connecting pin 52 is dimensioned to fit loosely within the respective mounting aperture 40. The carriers 12 are therefore adapted to pivot relative to each other when conveyed, for example, around a corner of the conveyor rail 14.

The yoke 16 is supported by bearings (not shown) on the end of the hinge pin 45 and, thus, is adapted to be pivoted about the axis of the hinge pin. The yoke 16 includes a pair of first rollers 54, each rotatably supported on the free end of a respective leg of the yoke. The first rollers 54 are positioned so that they rest against the conveyor rail 14 under the weight of the carrier 12 and, thus, are adapted to roll along the conveyor rail. The yoke 16 further includes a pair of second rollers 56 rotatably supported on either side of the yoke beneath the conveyor rail 14. The second rollers 56 are positioned in contact with the bottom of the conveyor rail 14 and, thus, adapted to guide the yoke 16 as it moves along the conveyor rail. The first rollers 54 and second rollers 56 are shown spaced away from the conveyor rail 14 in FIG. 2 only for purposes of illustration, and are each normally maintained in contact with the conveyor rail.

As shown in FIG. 3, the link frame 38 includes a plurality of square apertures 58 (illustrated in dashed lines) spaced apart from each other along the length of the frame. The first carrier frame 34 and the second carrier frame 36 each include a plurality of smaller square apertures 60 spaced apart from each other along the length of each frame. As shown in FIG. 3, each aperture 58 corresponds in position to a respective aperture 60 and, thus, each aperture 60 extends through the carrier 12.

The first carrier frame 34 and the second carrier frame 36 each include a bumper portion 62 extending substantially along the length of the respective frame. As shown in FIG. 2, each bumper portion 62 is located adjacent to either the first guide member 30 or the second guide member 32. The bumper portions 62 are adapted to slide against the first and second guide members 30 and 32, respectively, upon movement of the sorting conveyor 13 and, thus, maintain the carrier 12 in a vertically oriented position.

As shown in FIG. 3, the carrier 12 further includes a plurality of latch receptacles 64 formed within the bottom portion of the carrier and spaced apart from each other. A plurality of latch members 66 are each supported within a respective latch receptacle 64. Each carrier 12 is preferably the same as that shown and described in co-pending U.S. patent application Ser. No. 643,411, entitled "Carrier Assembly", filed on even date herewith and assigned to the same assignee as is the present invention, which is hereby expressly incorporated by reference herein.

Each latch receptacle 64 is adapted to receive a hooked member H, such as the hooked end of a hanger; and the respective latch member 66 is adapted to releasably support the hooked member H within the receptacle As shown in FIG. 3, each latch receptacle 64 corresponds in position to a respective aperture 60. The apertures 60 are, accordingly, provided for registering the positions of the receptacles 64 and, thus, the hooked members H supported within the receptacles, as is described further below.

Each latch member 66 is pivotally supported on one end by a latch pin 65 extending between the first carrier frame 34 and second carrier frame 36. Each latch member 66 includes a flexible spring arm 67, which is adapted to be flexed relative to the latch member 66. The free end of the spring arm 67 rests against a pin 69, which extends between the first carrier frame 34 and second carrier frame 36. Each spring arm 67 flexibly biases the respective latch member 66 in the direction of the carrier flow, as indicated by the arrows in FIGS. 1 and 3. Accordingly, each latch member 66 normally blocks the opening of the respective latch receptacle 64, as shown in FIG. 3.

A hooked member H is supported within a latch receptacle 66 by inserting the hooked member into the receptacle. As the hooked member H is pushed upwardly, it drives the flexibly biased latch member 66 toward the spring arm 67 and, thus, away from the opening of the receptacle. Then, once the hooked member H is received within the latch receptacle 64, the spring arm 67 causes the latch member 66 to spring back in the direction of the conveyor flow (as indicated by the arrow in FIG. 3) to block the opening of the receptacle and, thus, support the hooked member H, as shown in FIG. 3.

Each latch member 66 further includes a pair of tabs 68 projecting outwardly from either side of the respective latch member 66. Each latch member 66 is therefore adapted to be moved away from the opening of the respective latch receptacle 64, by moving either of the tabs 68 away from the direction of conveyor flow. Accordingly, a hooked member H is released from a receptacle 64 by pushing either respective tab 68 in the direction opposite the direction of conveyor flow, as is described further below.

The apparatus 10 further includes a solenoid 70 coupled to a trip arm 72, as shown in FIG. 2. The solenoid 70 is supported from the underside of the first guide member 30 and located so that the trip arm 72 can be driven into contact with a respective tab 68 upon actuation of the solenoid. The solenoid 70 is therefore adapted to be actuated to release a hooked member H from the respective latch receptacle 64 as the carrier 12 is moved in the direction of conveyor flow, by swinging the trip arm 72 into contact with the respective tab 68, as is described further below.

Figure 4:
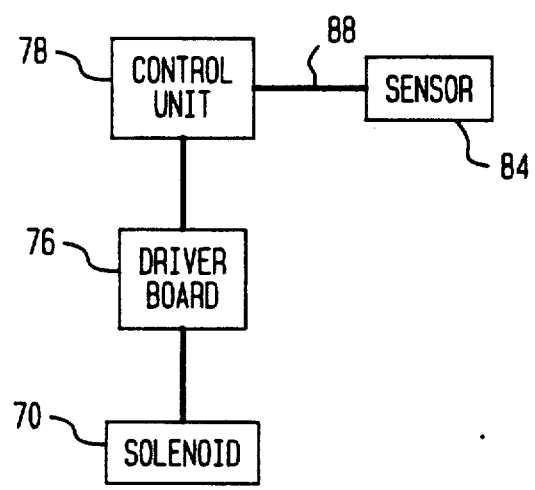
FIG. 4 is a schematic illustration of the control components of the apparatus of FIGS. 1 and 2.

The apparatus 10 further includes a control box 74 mounted to the support rods 24, as shown in FIG. 2. The control box 74 includes a driver board 76, which is coupled to the solenoid 70, as shown in FIG. 4. The driver board 76 is adapted to actuate the solenoid 70 in a manner known to those of ordinary skill in the art. A control unit 78 including a terminal 79, as shown in FIG. 1, is also coupled to the driver board 76. The control unit 78 is preferably a microprocessor based control unit of a type known to those of ordinary skill in the art. The driver board 76 is therefore adapted to actuate the solenoid 70 in response to a signal transmitted by the control unit 78, as is described further below.

A reflector bracket 80 extends upwardly from the second mounting plate 28, as shown in FIG. 2. The reflector bracket 80 includes a retroreflective target 82 mounted on its side facing the carrier 12. As shown in FIG. 2, the retroreflective target 82 is positioned so that it is located in line with each respective aperture 60 as the sorting conveyor 13 is moved in front of the retroreflective target.

An optical sensor 84 is supported within the control box 74 and coupled to the control unit 78 by a cable 88, as shown in FIG. 4. As shown in FIG. 2, the optical sensor 84 is located in line with the retroreflective target 82 on the opposite side of the carrier 12 with respect to the target. The optical sensor 84 is adapted to transmit an output signal to the control unit 78 in response to sensing the presence of the retroreflective target 82.

When the carrier 12 is conveyed between the retroreflective target 82 and the sensor 84, the sensor transmits an output signal to the control unit 78 when the edge of an aperture 60 passes the sensor. At that point in time, the tab 68 of the corresponding latch member 66 is in position to be driven into contact with the trip arm 72 in order to release the respective hooked member H. The control unit 78 is in turn adapted to count each aperture 60 and, thus, each latch member 66 based on the signals transmitted by the sensor 84, and to actuate the solenoid 70 to release the hooked members H in response to the corresponding signals transmitted by the sensor, as is described further below.

The sensor 84 continuously transmits each output signal so long as the respective aperture 60 is located in front of the sensor and, thus, in front of the retroreflective target 82. Then, once the other edge of the aperture 60 passes the sensor 84, the sensor no longer detects the presence of the retroreflective target 82 and, in turn, ceases to transmit the output signal. The retroreflective target 82 and the optical sensor 84 are of a type known to those of ordinary skill in the art, such as the type 42SRU Series 6200 Polarized Beam Reflex Control, manufactured by the Allen-Bradley Company, Photoswitch Division, of Waltham, Mass.

A slide rail assembly 92 is supported immediately below the solenoid 70 and trip arm 72, as shown in FIG. 2. The slide rail assembly 92 is supported from the free end of a rail mount 94 which, in turn, is coupled on the other end to the second mounting plate 28. The slide rail assembly 92 includes a hooked member 96 supported from the free end of the rail mount 94, and a slide rail 98 supported from the other end of the hooked member 96. As shown in FIG. 2, the slide rail 98 is inclined downwardly, and is adapted to receive a hooked member H released from a latch receptacle 64 upon actuation of the solenoid 70 and trip arm 72. Once the hooked member H is released, it falls onto the slide rail 98 and slides downwardly.

As shown in FIG. 1, there are a plurality of apparatus 10 located at different points along the sorting conveyor 13. The control unit 78 is adapted to control the release of the hooked members H and, thus, the articles supported on the hooked members into each respective slide rail assembly 92. The randomly arranged hooked members H and, thus, the articles supported on the sorting conveyor 13 can therefore be sorted in a predetermined order onto each respective slide rail assembly 92 for delivery to customers, for example, as is described further below.

As shown in FIG. 3, the carrier 12 further includes a rectangular aperture 100 located on one end of the carrier. The aperture 100 is positioned in line with the apertures 60 and corresponds in position to a respective latch receptacle 64. As shown in FIG. 3, because the aperture 100 is rectangular, it is longer than each of the apertures 60 in the direction of conveyor flow. In the embodiment of the present invention illustrated, only one carrier 12 in the entire sorting conveyor 13 includes the aperture 100. The aperture 100 is used to initialize the counting procedure for sorting the articles supported from the hooked members H on the sorting conveyor 13, as is described further below.

Because the aperture 100 is longer than each of the apertures 60, when the aperture 100 passes between the sensor 84 and the retroreflective target 82, the sensor transmits an output signal to the control unit 78 for a longer period of time then it does in response to the passing of a square aperture 60. The control unit 78 is adapted to sense the longer signal response and, in turn, initiate the counting procedure.

In the operation of the apparatus of the present invention, the sorting conveyor 13 is loaded with articles supported on hooked members H. Each hooked member H is inserted into a respective latch receptacle 64, as shown in FIG. 3. Prior to inserting each hooked member H into a respective latch receptacle 64, identifying information for the respective article can be entered into the control unit 78. The process by which the identifying information is obtained and the hooked members H are inserted into the receptacles 64 is preferably the same as that shown and described in copending U.S. patent application Ser. No. 643,777, entitled "Computer Control System and Method For Scanning and Loading Articles On A Conveyor", filed on even date herewith, which is assigned to the same assignee as is the present invention, and is hereby expressly incorporated by reference herein.

Based on the identifying information, the control unit 78 is adapted to control the sorting process of the sorting conveyor 13 to unload the articles onto the respective slide rail assemblies 92 in a predetermined order. The process by which the sorting occurs is preferably the same as that shown and described in copending U.S. patent application Ser. No. 643,777, entitled "Computer Control System and Method For Sorting Articles On A Conveyor", filed on even date herewith, which is assigned to the same assignee as is the present invention, and is hereby expressly incorporated by reference herein.

Once all of the hooked members H are inserted into the latch receptacles 64, the sorting conveyor 13 is advanced to move in the direction of conveyor flow, as indicated by the arrows in FIGS. 1 and 3. As the sorting conveyor 13 is advanced, each sensor 84 senses the passing of the apertures 60 and, in turn, transmits an output signal corresponding to each aperture 60 to the control unit 78. Based on the output signals, the control unit 78 counts each passing aperture 60 and, thus, each hooked member H passing through each apparatus 10.

In the embodiment of the present invention illustrated, the control unit 78 maintains a separate count for the articles passing through each respective apparatus 10. The counting procedure for each apparatus 10 is initiated upon sensing the passage of the rectangular aperture 100 between the respective sensor 84 and target 82. Preferably, the signal transmitted to the control unit 78 in response to the passage of the aperture 100 is assigned the value zero. Then, the signal transmitted in response to the passage of the next aperture 60 is assigned the value one. Each successive aperture 60 and, thus, article supported on a hooked member H is then assigned a successive value until the rectangular aperture 100 passes again through the respective apparatus 10. The control unit 78 then starts the counting procedure again.

During the counting procedure, the control unit 78 also controls the driver board 76 and, in turn, the actuation of the solenoid 70 to release the articles supported from the hooked members H into the respective slide rail assemblies 92. Based on the identifying information for each article, the control unit 78 assigns that article to a respective slide rail assembly 92. The control unit 78 also assigns each article a number indicative of its location on the sorting conveyor relative to the zero position corresponding to the rectangular aperture 100. Thus, based on the signals transmitted by each optical sensor 84, the control unit 78 counts the articles passing through each respective apparatus 10 and, in turn, controls the release of the articles onto predetermined slide rail assemblies 92.

For example, the control unit 78 may determine that the articles numbered 25 and 35 are to be delivered to the same slide rail assembly 92. Therefore, when the optical sensor 84 of the respective apparatus 10 transmits the 25th output signal since the initiation of the counting procedure (i.e., since the transmission of the signal indicative of the passage of the rectangular aperture 100), the control unit 78 transmits a signal to the driver board 76 to, in turn, actuate the solenoid 70.

Then, as the carrier 12 is moved in the direction of conveyor flow, as indicated by the arrow in FIG. 3, the trip arm 72 is actuated to swing into contact with the tab 68 of the latch member 66 supporting the article number 25. As a result, the latch member 66 is forced away from the opening of the respective receptacle 64, and the hooked member H and article number 25 are, in turn, released from the receptacle. The hooked member H and article number 25 then drop onto the respective slide rail 98, as shown in FIG. 2. The control unit 78 then stops transmitting the signal to the driver board 76 which, in turn, deenergizes the solenoid 70 and, thus, swings the trip arm 72 back into its initial position.

Then, when the 35th output signal is transmitted by the optical sensor 84 of the respective apparatus 10, the control unit 78 transmits another signal to the driver board 76 to actuate the solenoid 70. The trip arm 72 therefore swings into contact with the tab 68 of the latch member 66 supporting the article number 35. As a result, the article number 35 is released onto the slide rail assembly 92 next to the article number 25. The control unit 78 then stops transmitting the signal to the driver board 76 which, in turn, deenergizes the solenoid 70 and, thus, swings the trip arm 72 back into its initial position.

This procedure is carried out for each apparatus 10 on the sorting conveyor 13 until each hooked member H is dropped into a predetermined slide rail assembly 92. Once all of the articles are sorted into the predetermined slide rail assemblies 92, they can then be removed for delivery to the customers.

As will be recognized by those skilled in the art, one advantage of the apparatus of the present invention, is that the construction of the sensor 84, target 82, and apertures 60 permits the control unit 78 to automatically and reliably count the passing of each article, to determine the position of each article on the conveyor, and to correctly release the articles into their predetermined slide rail assemblies.

We claim:

1. An apparatus for conveying hooked members, comprising:
    a carrier member adapted to convey the hooked members and defining at least one aperture corresponding in position to at least one hooked member supported on the carrier member;

a target member supported on one side of the carrier member; and a sensor supported on the opposite side of the carrier member relative to the target member, wherein upon passage of the at least one aperture of the carrier member between the target member and the sensor, the sensor senses the target member and generates a signal indicative thereof.

2. An apparatus as defined in claim 1, wherein the carrier member defines a plurality of first apertures extending therethrough, each first aperture corresponding to a respective hooked member supported on the carrier member, wherein upon the passage of each first aperture between the target member and the sensor, the sensor senses the target member and generates a first signal indicative thereof.

3. An apparatus as defined in claim 2, further comprising:

a control unit coupled to the sensor and adapted to determine the position of each hooked member on the carrier member based on the first signals transmitted by the sensor.

4. An apparatus as defined in claim 3, wherein the carrier member defines a second aperture extending therethrough, the second aperture being defined by a different dimension in the direction of conveyance in comparison to that of each first aperture, wherein upon the passage of the second aperture between the target member and the sensor, the sensor senses the target member and, in turn, transmits a second signal indicative thereof to the control unit, the second signal having a different duration in comparison to that of each first signal, the control unit thus being adapted to differentiate between the first and second signals 5. An apparatus as defined in claim 4, further comprising:

a release member coupled to the control unit and adapted to be actuated by the control unit in response to a first or second signal transmitted by the sensor to release a corresponding hooked member from the carrier member.

6. An apparatus as defined in claim 5, wherein the control unit is adapted to count each first aperture passing between the sensor and the target member and, thus, each corresponding hooked member based on the first and second signals transmitted by the sensor.

7. An apparatus as defined in claim 6, wherein the control unit is adapted to assign an initial value to the second aperture in response to the second signal, and further adapted to assign successive values to the first apertures passing between the sensor and the target member in response to the first signals transmitted by the sensor following each second signal, in order to count the hooked members and determine the position of the hooked members on the carrier member.

8. An apparatus as defined in claim 5, further comprising:

a plurality of latch members coupled to the carrier member, each latch member corresponding in position to a respective first aperture and adapted to support a hooked member, wherein the release member is adapted to be actuated to move each latch member and, in turn, release the respective hooked member from the carrier member.

9. An apparatus as defined in claim 8, further comprising:

a drive unit coupled to the release member and to the control unit, the drive unit being adapted to be actuated in response to a signal transmitted by the control unit to move the release member into contact with a latch member to release the respective hooked member from the carrier member.

10. An apparatus for conveying hooked members supporting articles, comprising:

a carrier member for supporting and conveying the hooked members and including a plurality of first apertures spaced apart from each other, each first aperture corresponding in position to a respective hooked member; and means for sensing each first aperture upon conveyance of the carrier member and for generating first signals indicative thereof.

11. An apparatus as defined in claim 10, further comprising:

a control unit coupled to the means for sensing and adapted to determine the position of each hooked member on the carrier member based on the first signals.

12. An apparatus as defined in claim 11, wherein the carrier member defines a second aperture, and the means for sensing senses the presence of the second aperture upon conveyance of the carrier member and transmits a second signal indicative thereof.

13. An apparatus as defined in claim 12, further comprising:

a release member supported adjacent to the carrier member and coupled to the control unit, the release member being adapted to be actuated by the control unit in response to a first or second signal to release a corresponding hooked member from the carrier member.

14. An apparatus as defined in claim 13, wherein the control unit is adapted to count each first aperture and the second aperture and, thus, each corresponding hooked member based on the first and second signals.

15. An apparatus as defined in claim 14, wherein the control unit is adapted to assign an initial value to the second aperture in response to the second signal, and further adapted to assign successive values to the first apertures in response to the first signals following each second signal, in order to count the hooked members and determine the position of the hooked members on the carrier member.

16. An apparatus as defined in claim 13, further comprising:

a plurality of latch members coupled to the carrier member, each latch member corresponding in position to a respective first aperture and adapted to support a hooked member, wherein the release member is adapted to be actuated to move each latch member and, in turn, release the respective hooked member.

17. An apparatus as defined in claim 16, further comprising:

a drive unit coupled to the release member and to the control unit, the drive unit being adapted to be actuated by the control unit to move the release member into contact with a latch member to release the respective hooked member from the carrier member.

18. An apparatus as defined in claim 10, wherein the means for sensing includes an optical sensor located on one side of the carrier member and a target member located on the opposite side of the carrier member relative to the optical sensor, the optical sensor being adapted to sense the presence of the target member upon the passage of a first aperture between the optical sensor and the target member and to generate a first signal in response thereto.

19. An apparatus for conveying hooked members comprising:
- a carrier member adapted to convey the hooked members and defining a plurality of first apertures;
- a plurality of latch members supported from the carrier member and spaced relative to each other, each latch member corresponding in position to a respective first aperture and being adapted to support a hooked member;
- a target member supported on one side of the carrier member; and
- a sensor located on the opposite side of the carrier member relative to the target member, wherein upon the passage of a first aperture between the sensor and the target member, the sensor senses the target member and in turn transmits a first signal indicative thereof, the sensor being adapted to transmit an output signal in response to sensing the presence of the target member and, thus, the passage of a second aperture between the sensor and the target member.

20. An apparatus as defined in claim 19, wherein the carrier member further defines a second aperture defined by a different dimension in the direction of conveyor flow in comparison to each first aperture, and the sensor is adapted to sense the presence of the target member upon the passage of the second aperture between the sensor and the target member and, in turn, generate a second signal indicative thereof.

* * * * *